(12) United States Patent
Brookens et al.

(10) Patent No.: US 7,174,712 B1
(45) Date of Patent: Feb. 13, 2007

(54) HYDROSTATIC TRANSMISSION BYPASS LINKAGE

(75) Inventors: Joseph L. Brookens, Taylorville, IL (US); Thomas D. Wiley, Lovington, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 79 days.

(21) Appl. No.: 11/018,296

(22) Filed: Dec. 21, 2004

(51) Int. Cl.
*F16D 31/00* (2006.01)
*F16D 31/02* (2006.01)
(52) U.S. Cl. .............................. 60/487; 60/489; 60/494
(58) Field of Classification Search .................. 60/487, 60/494, 489
See application file for complete search history.

(56) References Cited

U.S. PATENT DOCUMENTS

| | | | |
|---|---|---|---|
| 5,201,692 A | 4/1993 | Johnson et al. | |
| 5,394,699 A * | 3/1995 | Matsufuji | 60/442 |
| 5,423,182 A | 6/1995 | Hauser et al. | |
| 5,497,623 A | 3/1996 | Hauser et al. | |
| 5,509,496 A | 4/1996 | Erickson et al. | |
| 5,588,294 A | 12/1996 | Sakakura et al. | |
| 5,836,159 A * | 11/1998 | Shimizu et al. | 60/487 |
| 5,950,500 A * | 9/1999 | Okada et al. | 60/494 |
| 5,957,229 A * | 9/1999 | Ishii | 180/6.48 |
| 6,185,936 B1 | 2/2001 | Hauser et al. | |
| 6,256,989 B1 | 7/2001 | Hauser et al. | |
| 6,370,876 B1 | 4/2002 | Langenfeld | |
| 6,374,604 B1 | 4/2002 | Poplawski et al. | |
| 6,681,570 B2 | 1/2004 | Takada et al. | |

* cited by examiner

*Primary Examiner*—Igor Kershteyn
(74) *Attorney, Agent, or Firm*—Neal, Gerber & Eisenberg LLP (57) ABSTRACT

Disclosed is a vehicle comprising a transaxle and a bypass mechanism. The transaxle has a plurality of mounting holes for use in attaching the transaxle to the vehicle. Further, the transaxle has at least one mounting hole more than is used to attach the transaxle to the vehicle. The bypass mechanism comprises a bypass linkage. Finally, the bypass linkage is supported by the mounting hole.

20 Claims, 8 Drawing Sheets

HYDROSTATIC TRANSMISSION BYPASS LINKAGE

FIELD OF THE PRESENT INVENTION

The Present Invention relates generally to hydrostatic transmission ("HST") systems and transaxles, and, in particular, to a bypass system for use in such systems and transaxles. Specific exemplary embodiments discussed herein relate to vehicles such as, for example, riding lawn mowers and similar tractors.

BACKGROUND OF THE PRESENT INVENTION

The description of references in this Section is not intended to constitute an admission that any patent, publication or other information referred to herein is "Prior Art" with respect to the Present Invention, unless specifically designated as such.

HST systems are well known in the industry, and are more fully described in, e.g., U.S. Pat. No. 5,314,387, the contents of which are incorporated herein by reference in its entirety. In general, a typical HST system possesses, inter alia, a hydraulic pump and a hydraulic motor mounted in a housing. The pump and motor are hydraulically-linked through a generally-closed circuit, and both consist of a rotatable body with pistons mounted therein. A hydraulic fluid, such as, for example, oil, is maintained in the generally-closed circuit, and the HST generally has a sump, or reservoir, with which the generally-closed circuit can exchange oil. In certain instances, this sump may be formed by the housing itself.

The pump is usually driven by an external motive source, such as, for example, pulleys and belts or drive shafts connected to an internal combustion engine. The pump pistons engage a moveable swash plate and, as the pump is rotated by an input source driven by the external engine, the pistons engage the swash plate. Other HST designs may use a radial piston or ball piston pump and motor design, but the general operation is, in any event, similar, and the Present Invention is not limited to use with a specific design. Movement of the pump pistons creates movement of the hydraulic fluid from the pump to the motor, causing the rotation thereof. The motor pistons are engaged against a fixed plate, and rotation of the motor drives an output shaft engaged thereto. This output shaft may be linked to mechanical gearing and output axles, which may be internal to the HST housing, as in an integrated hydrostatic transaxle ("IHT"), or external thereto.

The system is fully reversible in a standard HST. This means that as the swash plate against which the pump pistons move is moved, the rotational direction of the motor can be changed, such as in a forward or reverse direction. In addition, there is a "neutral" position where the pump pistons are not moved in an axial direction, so that rotation of the pump does not create any movement of the hydraulic fluid.

The HST generally-closed circuit has two sides, namely a high pressure side in which oil is being pumped from the pump to the motor, and a low pressure, or vacuum, side, in which oil is being returned from the motor to the pump. When the swash plate angle is reversed, the flow out of the pump reverses so that the high pressure side of the circuit becomes the vacuum side, and vice versa. This hydraulic circuit can be formed as porting formed within the HST housing internal to a center section on which the pump and motor are rotatably mounted or in other ways known in the industry. Check valves are often used to draw hydraulic fluid into the low pressure side to make up for fluid lost due to leakage, for example. Such check valves may be located so that they directly contact the porting or they may be located separate from the porting and connected through additional bores to the closed circuit.

There is a need to have a means to open, or bypass, this closed circuit in certain circumstances. For example, when the vehicle is stopped, the oil in the closed circuit provides for hydraulic braking, making it difficult to manually move the vehicle. Mechanical bypass designs are known in the art and are described in, for example, U.S. Pat. No. 5,423,182, the contents of which are incorporated herein by reference in its entirety. Such designs generally achieve bypass by opening the closed hydraulic circuit to the sump by, e.g., opening check valves in the circuit or by opening a shunt between the high pressure and low pressure sides of the circuit. Such designs are generally complicated and add significantly to the cost of the unit.

In order to effect the actuation of the bypass in a more cost-effective manner, a bypass actuator and a bypass arm are often provided. A linkage is then connected to the actuator or the arm to operate the bypass mechanism. Such linkages are generally attached to some portion of the vehicle by a vehicle manufacturer, entailing complexity in their assembly process by requiring an attachment or other interface location, as well as the need for assembly or connection of the linkage. Thus, there is a need for an improved bypass linkage.

SUMMARY OF THE PRESENT INVENTION

The Present Invention addresses the shortcomings in prior bypass linkage designs, as an improved bypass linkage for an HST is disclosed herein. One object of the Present Invention is to provide an improved bypass linkage mounting location to simplify attachment or mounting of such linkage to a vehicle in which the HST is used. Another object of the Present Invention is to simplify the assembly of such units by reducing the number of interface points between the vehicle and the HST or IHT.

Thus, in accordance with the tenets and teachings of the Present Invention, disclosed is a vehicle comprising a transaxle and a bypass mechanism. The transaxle has a plurality of mounting holes for use in attaching the transaxle to the vehicle. Further, the transaxle has at least one mounting hole more than is used to attach the transaxle to the vehicle. The bypass mechanism comprises a bypass linkage. Finally, the bypass linkage is supported by the mounting hole.

Other objects and advantages of the Present Invention will be apparent from the following Detailed Discussion Of Exemplary Embodiments Of The Present Invention, with reference to the attached Figures and Claims disclosed herein.

BRIEF DESCRIPTION OF THE DRAWINGS

In the interest of enabling one of skill in the art to practice the Present Invention, exemplary embodiments are illustrated and described. For clarity and brevity, details apparent to those of skill in the art without undue experimentation are generally omitted from the Figures and Description.

DESCRIPTION OF EXEMPLARY EMBODIMENTS OF THE PRESENT INVENTION

The Present Invention herein is discussed in relation to lawn tractors generally possessing HST systems. However, other uses will be apparent from the tenets and teachings disclosed herein. The Present Invention will be better understood from the following detailed description of exemplary embodiments with reference to the attached Figures, wherein like reference numerals and characters are intended to refer to like parts, and by reference to the following Claims.

Figure 1:
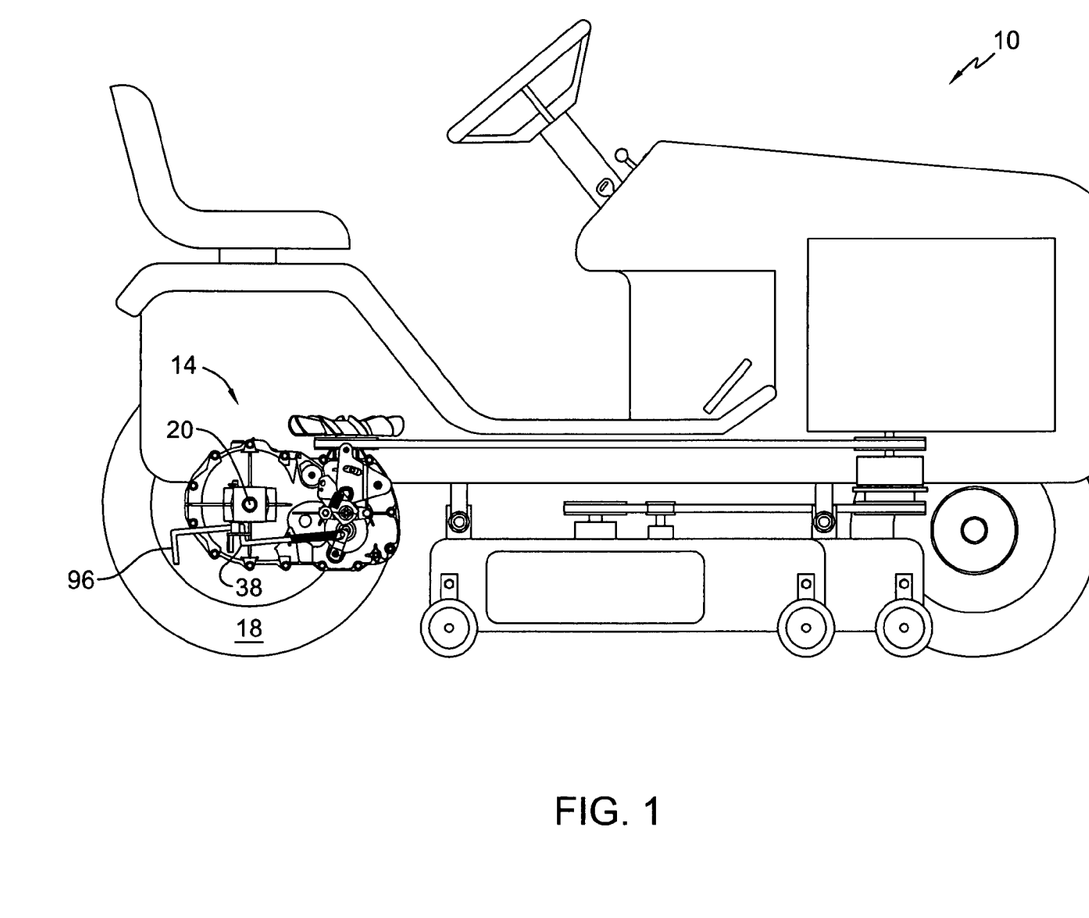
FIG. 1 illustrates a side view of one embodiment of a vehicle, with a bypass assembly attached, made in accordance with the tenets and teachings of the Present Invention.

FIG. 1 depicts vehicle 10. Referring to FIG. 1, vehicle 10 comprises transaxle 14. Further, bypass linkage assembly 38 is also illustrated in FIG. 1 as being disposed on transaxle 14. In the embodiment illustrated in FIG. 1, bypass linkage assembly 38 is illustrated in the "off," deactivated or disengaged position.

Alternatively, it should be noted that some vehicles may have transaxle 14 (or, more generally, the transmission of vehicle 10) rotated 180° degrees from that which is illustrated in FIG. 1. If transaxle 14 is thusly rotated, then bypass linkage assembly 38 may extend forward, rather than rearward, as illustrated. In this regard, it is also contemplated that a portion of bypass linkage assembly 38 may also be positioned to provide access to bypass linkage assembly 38 from another direction without changing the orientation of transaxle 14. Thus, a design wherein bypass linkage assembly 38 extends from the rear direction of vehicle 10 is only one of many options for providing customer access to bypass linkage assembly 38. For example, in an embodiment wherein bypass linkage assembly 38 extends to one of the sides, the orientation of handle portion 96 at the attachment point of bypass linkage assembly 38 to transaxle 14 need only be rotated toward a side of vehicle 10 to provide the desired access. Other mechanisms to attain the desired rotary motion will be apparent to those of skill in the art.

Figure 2:
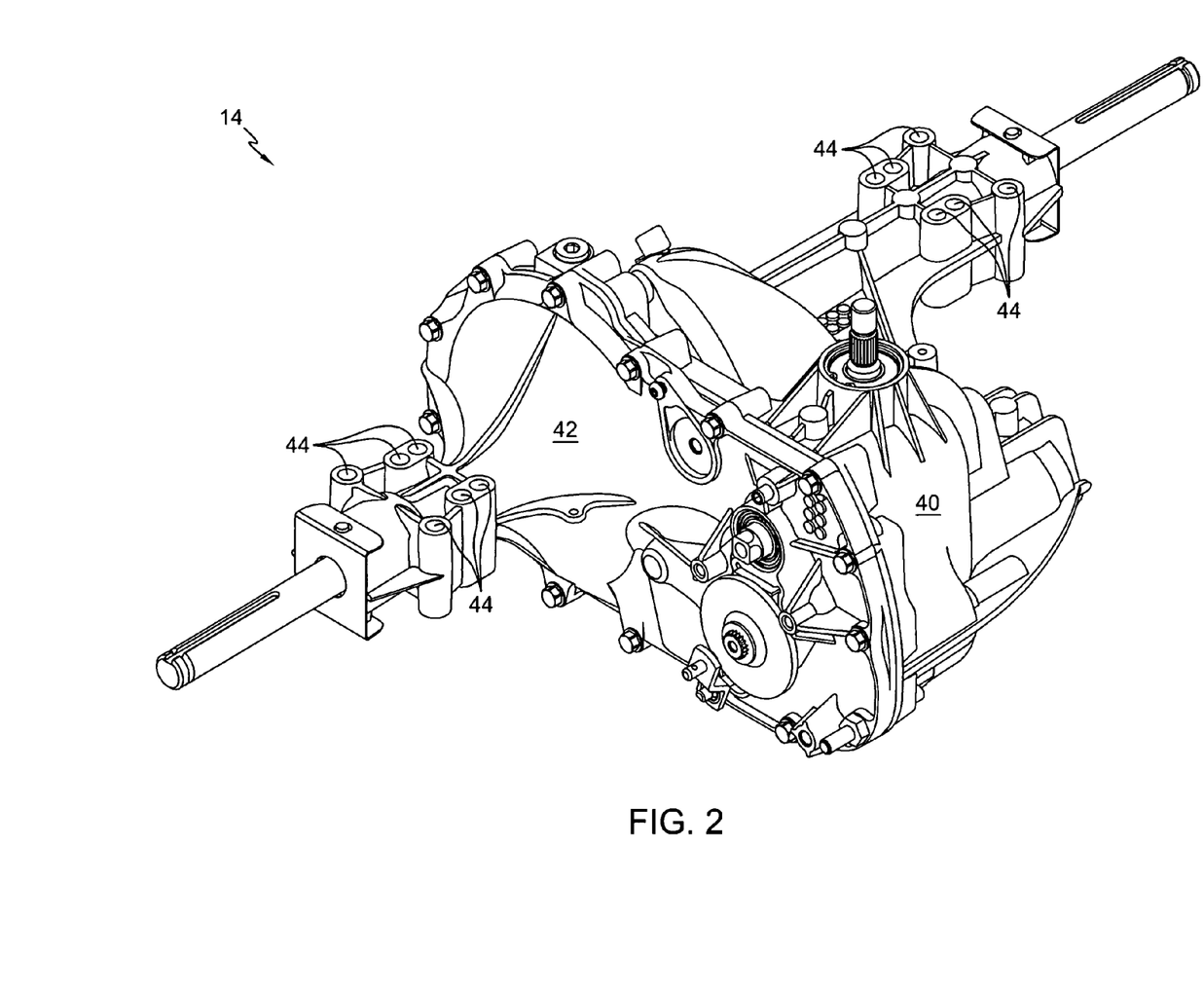
FIG. 2 illustrates a perspective view of the transaxle depicted in the vehicle of FIG. 1, without the bypass linkage assembly installed.

FIG. 2 depicts a perspective view of transaxle 14 of FIG. 1 according to one embodiment of the Present Invention. Referring to FIG. 2, transaxle 14 is illustrated as comprising a vertically split housing comprising main casing 40 and side casing 42. It should be noted that the arrangement of these housing elements are a key feature of the design of transaxle 14, but the embodiments of the Present Invention do not necessarily require any specific housing configuration, and other housing configurations can be accommodated herewith.

As illustrated in FIG. 2, in one embodiment of the Present Invention, main casing 40 and side casing 42 include a plurality of mounting holes 44 formed therein. Mounting holes 44—which can be configured to extend through transaxle 14, providing an opening that can be accessed from both top and bottom—are used to secure transaxle 14 to a frame of vehicle 10. These holes can be sized as needed for the particular application in which transaxle 14 is intended to be used. Further, a some of the plurality of mounting holes 44 are often provided to accommodate the mounting of transaxle 14 to vehicle 10 in a variety of frame widths and configurations. Therefore, not every mounting hole 44 is used in the mounting of transaxle 14 to vehicle 10. Thus, in addition to securing transaxle 14 to the frame of vehicle 10 through mounting holes 44, mounting holes 44 may also be used for other purposes, such as, for example, to provide both a mounting point and a pivot point for bypass linkage assembly 38. The utilization of one of the mounting holes 44 as both a mounting point and a pivot point for bypass linkage assembly 38, in accordance with the Present Invention, is illustrated in FIGS. 3 and 4.

Figure 5:
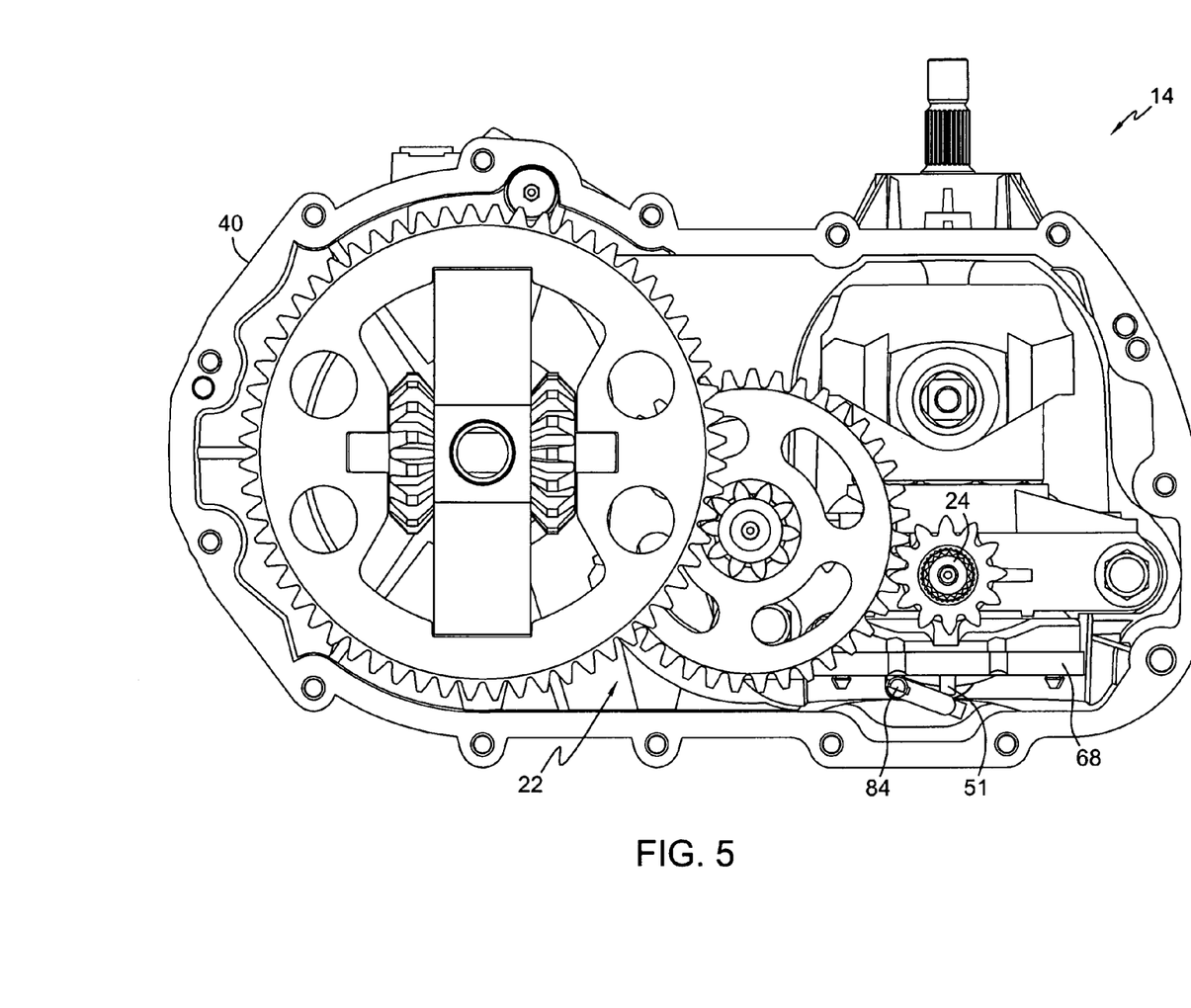
FIG. 5 illustrates a side view of the transaxle depicted in FIG. 2, with a housing portion removed.
Figure 6:
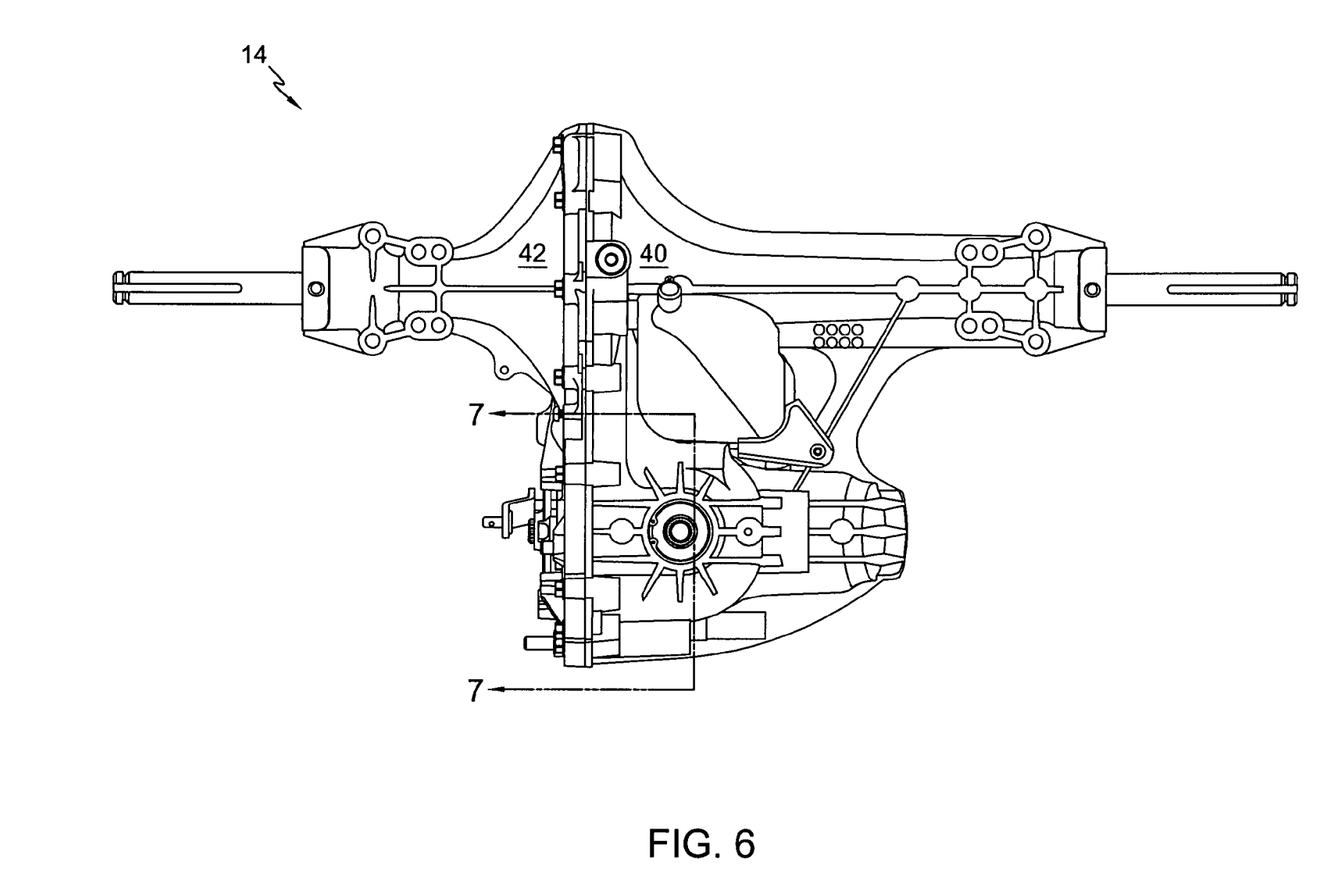
FIG. 6 illustrates a top plan view of the transaxle depicted in FIG. 2, without the bypass linkage assembly installed.

FIG. 5 illustrates a side view of transaxle 14, with side casing 42 removed. In the view of transaxle 14 illustrated in FIG. 5, transaxle 14 is shown as comprising bypass actuator rod 84. Also illustrated in FIG. 7, bypass actuator rod 84 controls the movement of an actuation tab 51 extending from filter 68.

Figure 7:
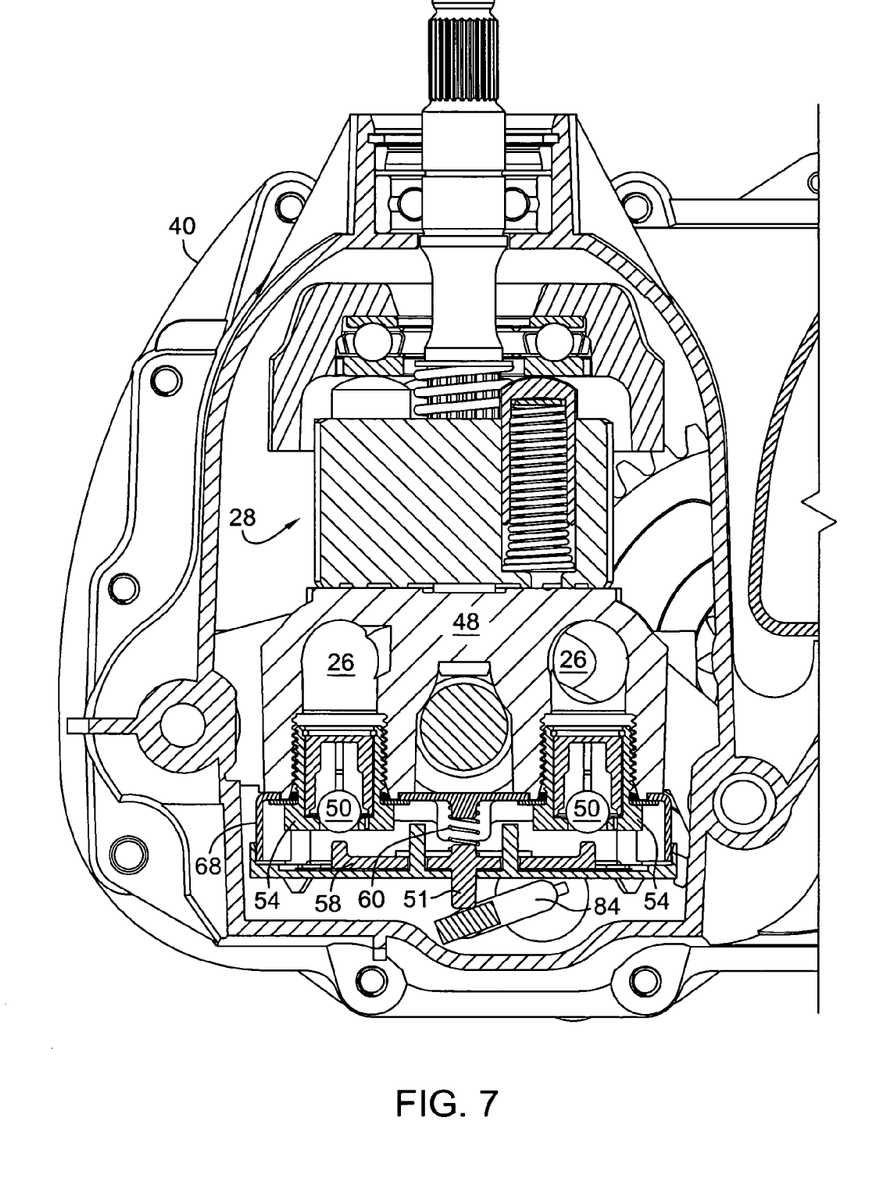
FIG. 7 illustrates a cross-sectional view of the transaxle depicted in FIG. 6, along Line 7—7.

FIG. 7 illustrates a portion of the interior workings of center section 48 and filter 68 of transaxle 14. FIG. 7 is similar to FIG. 3 of U.S. Pat. Nos. 6,318,080 and 6,401,568, the contents of which are also incorporated herein by reference in their entireties, which serve to disclose the interior workings of center section 48 and filter 68 of transaxle 14.

Figure 3:
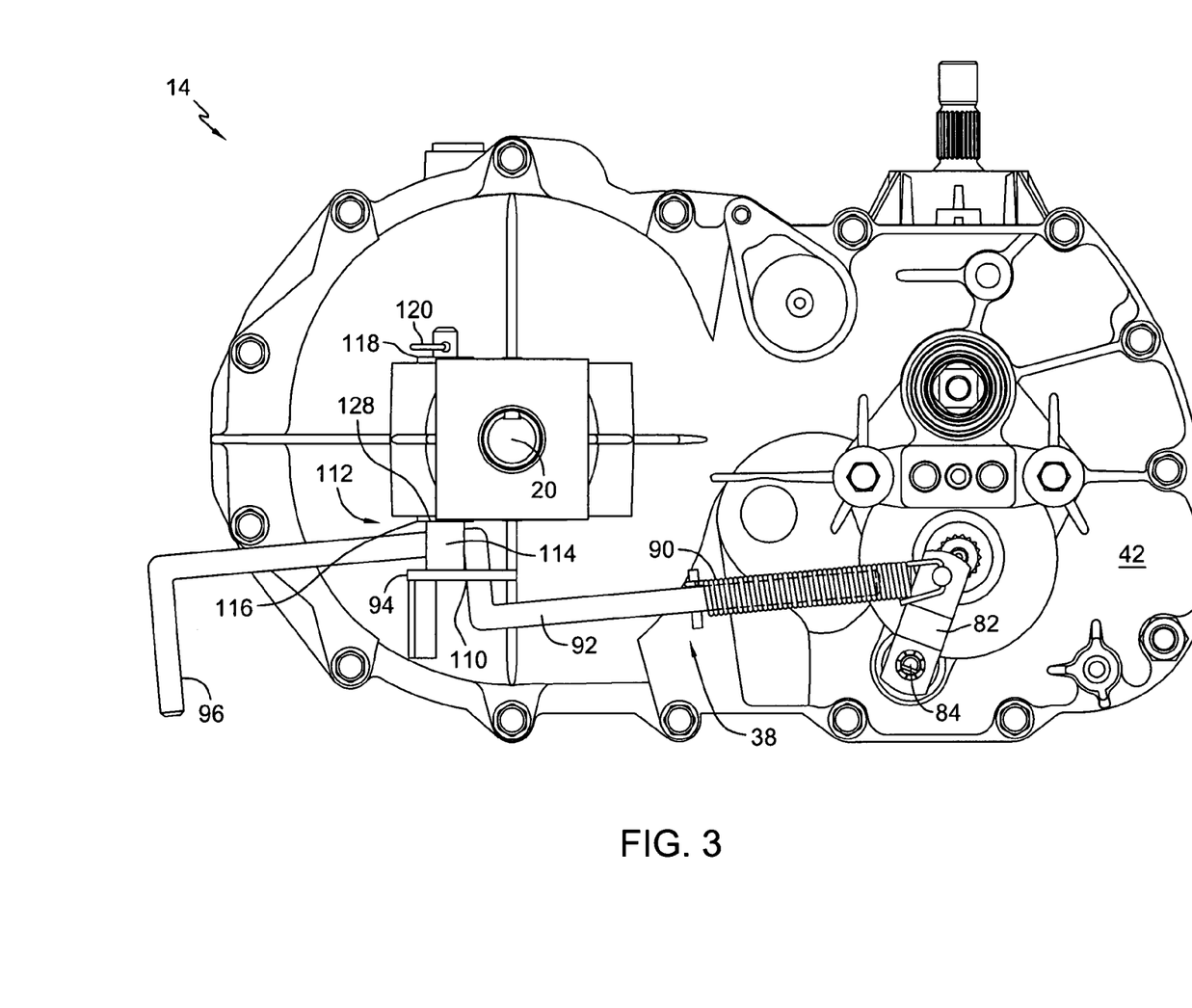
FIG. 3 illustrates a side view of the transaxle depicted in FIG. 2, illustrating the bypass linkage assembly mounted to the transaxle in an "off," deactivated or disengaged position.
Figure 4:
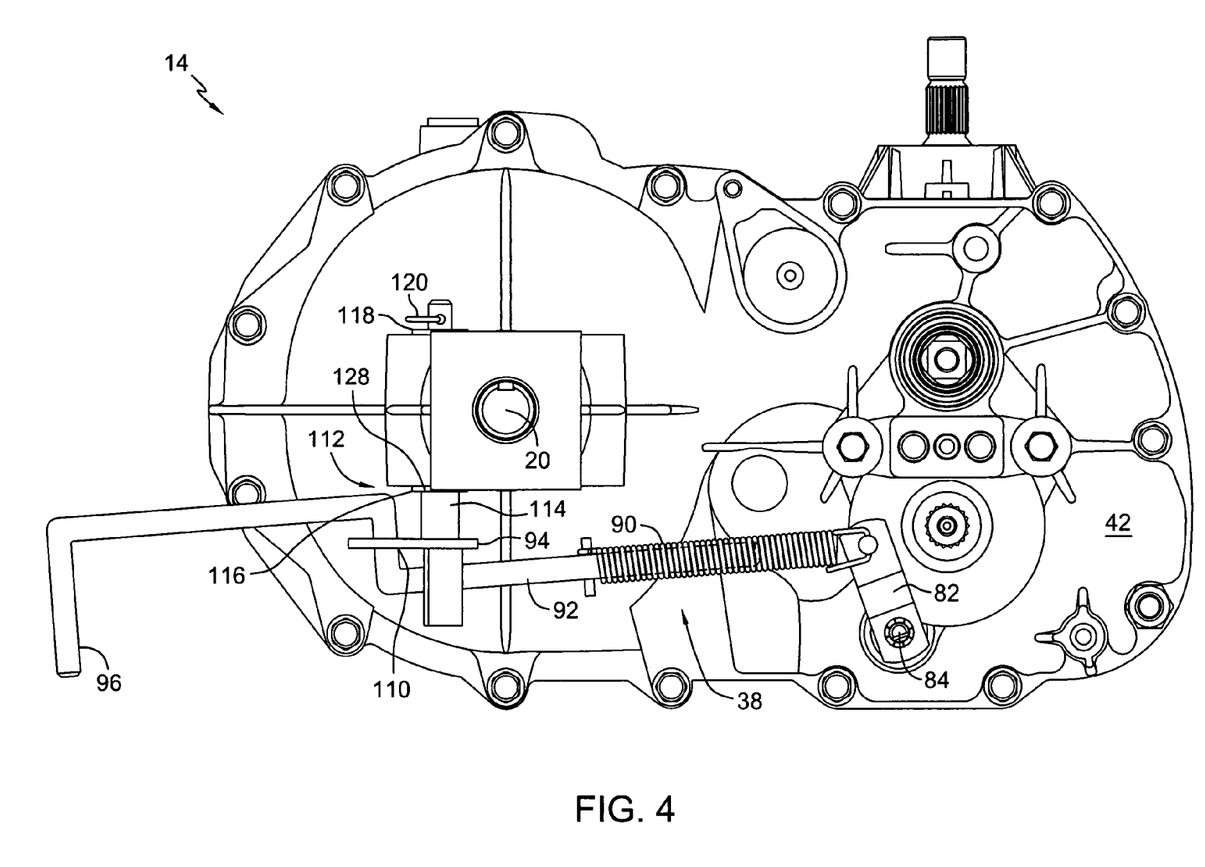
FIG. 4 illustrates a side view of the transaxle depicted in FIG. 2, illustrating the bypass linkage assembly mounted to the transaxle in an "on," activated or engaged position.

As shown in FIG. 3, bypass arm 82 is matingly attached to bypass actuator rod 84. As bypass arm 82 is moved from the deactivated position shown in FIG. 3 to the activated position shown in FIG. 4, actuator rod 84 is similarly moved to contact and move bypass actuator 58 by means of actuation tab 51 (this is best illustrated in FIG. 7). Bypass actuator 58 moves against the force of bypass spring 60 to push check balls 50 (also illustrated in FIG. 7) off their seats.

If vehicle 10 is pushed with bypass actuator 58 in the activated position, wheels 18 will rotate axles 20, thereby causing rotation of various elements of gear train 22 and, thus, motor shaft 24. As motor shaft 24 rotates it will further cause rotation of a hydraulic motor (not illustrated), causing the motor to pump hydraulic fluid through center section porting 26. With check balls 50 moved away from their seats, hydraulic fluid can move freely around check balls 50, exiting or entering check plugs 54, thus allowing the motor and motor shaft 24 to rotate, which further allows axle shafts 20 to rotate. When bypass arm 82 is returned to the deactivated position, bypass actuator 58 returns to the deactivated position, aided by spring 60. Check balls 50 are then reseated, and, when vehicle 10 is pushed, any hydraulic fluid pumped by the hydraulic motor through porting 26 attempts to rotate pump 28, making vehicle 10 difficult to move.

Figure 8:
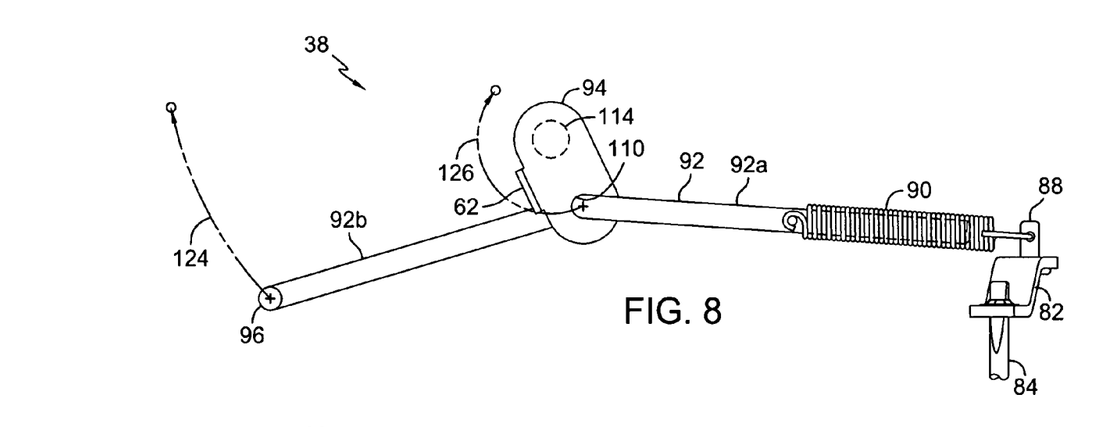
FIG. 8 illustrates a bottom plan view of the bypass linkage assembly depicted in FIGS. 1, 3 and 4 in an "off," deactivated or disengaged position.
Figure 9:
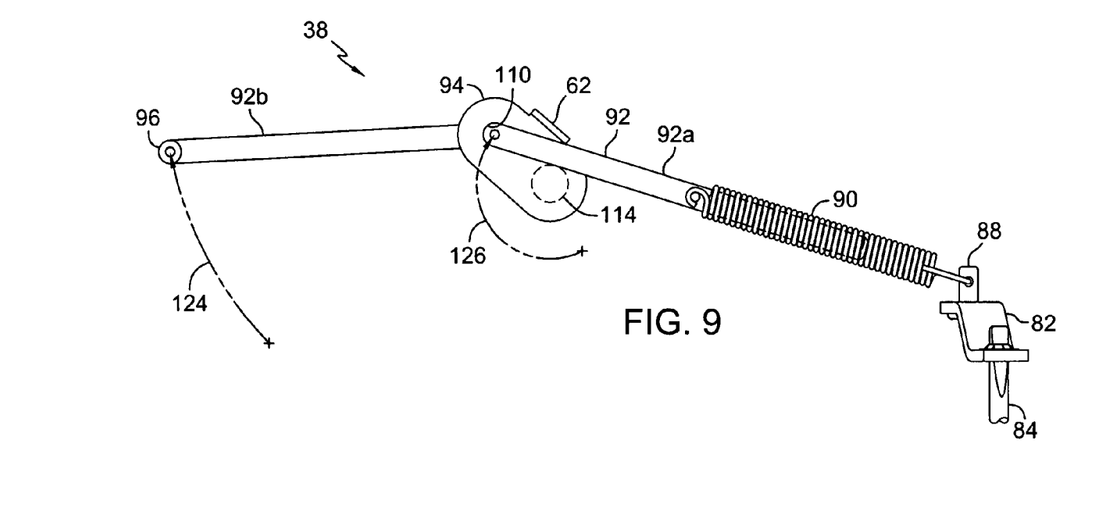
FIG. 9 illustrates a bottom plan view of the bypass linkage assembly depicted in FIGS. 1, 3 and 4 in an "on," activated or engaged position.

FIGS. 8 and 9 illustrate plan views of bypass linkage assembly 38 in both disengaged (FIG. 8) and engaged (FIG. 9) positions. With reference to FIGS. 8 and 9, generally speaking, bypass linkage assembly 38 comprises spring 90, actuating link 92, pivot link 94 and handle portion 96.

As is illustrated in FIGS. 8 and 9, bypass arm 82 is coupled to the end of bypass actuator rod 84 that extends through side casing 42. Disposed at an opposing end of bypass arm 82 is stud 88, which may be integral with bypass arm 82, or may be a separate piece, such as, for example, a bolt disposed within bypass arm 82. Spring 90 is connected to stud 88.

Spring 90 is attached to actuating link 92 such that actuating link 92 extends through the center of spring 90. When bypass linkage assembly 38 is in the deactivated position shown in FIG. 8, actuating link 92 is sufficiently close to stud 88 to minimize slack in spring 90 that might cause bypass linkage assembly 38 to interfere with other components of transaxle 14.

Actuating link 92, as can be best seen from FIGS. 3 and 4, is shaped such that, as actuating link 92 approaches pivot link 94, actuating link 92 bends at a substantially 90° angle in a direction relatively perpendicular to itself (i.e., in the vertical, or "Y," axis relative to itself). This direction is generally in an upward direction from the bottom side of transaxle 14. As actuating link 92 bends, actuating link 92 rotatably fits within opening 110 of pivot link 94.

Still referring to FIGS. 3 and 4, there is illustrated mounting assembly 112. Extending from pivot link 94 is mounting pin 114. Mounting pin 114 extends through one of mounting holes 44. Washer 116 is disposed between shoulder 128 formed on mounting pin 114 and the bottom of one of the plurality of mounting holes 44 to limit upward movement of pin 114. Washer 118 is disposed between cotter pin 120 inserted into mounting pin 114 and the top of the mounting hole 44. In addition to aiding in retention of mounting pin 114 in a mounting hole 44, washers 116 and 118 also provide wear surfaces for shoulder 128 and cotter pin 120 as bypass linkage assembly 38 is actuated. Note that while shoulder 128 is shown formed as part of pin 114, it could also be formed on a separate sleeve that is then mounted on pin 114. Alternatively, in some cases, shoulder 128 may be unnecessary.

Referring to FIGS. 3, 4, 8 and 9, after passing through opening 110, actuating link 92 bends substantially 90° to be in a plane generally parallel to first portion 92a of actuating link 92. Actuating link 92 then extends outward and is formed into handle portion 96. Handle portion 96 is an extension of actuating link 92 that may be formed at an angle to second portion 92b of actuating link 92, and is depicted in FIGS. 3 and 4 as being generally perpendicular and extending downward from second portion 92b. Opposite from the first perpendicular curve, described above, this time, handle portion 96 extends vertically downward (i.e., in the negative "y" direction) towards the bottom side of transaxle 14.

In the embodiment shown, to actuate bypass arm 82, a user would grab handle portion 96 and move handle portion 96 in a direction generally away from transaxle 14. This direction is illustrated by direction arrow 124 in FIGS. 8 and 9, with "+" marking the starting spot, and "○" marking the termination point. Because opening 110 is located at a radial distance from mounting pin 114, as actuating link 92 causes pivot link 94 to rotate about mounting pin 114, actuating link 92 will move away from bypass arm 82, thereby causing spring 90 to be pulled. As spring 90 is pulled it pulls on bypass arm 82, placing transaxle 14 in a bypass mode.

Because bypass linkage assembly 38 includes an over-center feature, meaning that the line of action between bypass arm 82 and pivot link 94 passes over the center of rotation of pivot link 94 at mounting pin 114, as exemplified by direction arrow line 126, there is a potential to place excessive actuating force on bypass arm 82. Thus, spring 90 is designed to stretch when bypass arm 82 has been moved to full actuation, preventing damage to bypass actuator rod 84, bypass actuator 58, and other elements associated with bypass operation. To limit the movement of actuating link 92 such that it remains in a position to keep bypass arm 82 in an actuated position, stop 62 is provided on pivot link 94. Stop 62 is shown as integrally formed with pivot link 94, but it may be formed separately.

While the Present Invention has been particularly shown and described with reference to particular embodiments thereof, it will be understood by those skilled in the art that various changes in form and detail may be made therein without departing from the spirit and scope of the invention. The scope of the claimed invention is intended to be defined by following claims as they would be understood by one of ordinary skill in the art with appropriate reference to the specification, including the drawings, as warranted.

What is claimed is:

1. A vehicle comprising:
   a vehicle frame;
   a transaxle disposed in a transaxle housing located on the vehicle frame;
   a plurality of mounting holes formed in and extending through the transaxle housing for use in attaching the transaxle housing to the vehicle frame, wherein each mounting hole is capable of receiving a fastener to secure the transaxle housing to the frame, and the transaxle housing has at least one mounting hole more than is used to attach the transaxle housing to the vehicle frame; and
   a bypass mechanism comprising a bypass linkage; wherein the bypass linkage is supported by a member inserted into one of the mounting holes.

2. The vehicle of claim 1, wherein the member comprises a pin inserted into the mounting hole.

3. The vehicle of claim 2, wherein the pin is rotatable within the mounting hole.

4. The vehicle of claim 1, wherein the bypass mechanism further comprises an over-center feature to maintain the transaxle in bypass when the bypass mechanism is engaged.

5. The vehicle of claim 1, wherein the bypass linkage comprises an actuating link.

6. The vehicle of claim 5, wherein the actuating link comprises a handle.

7. The vehicle of claim 5, wherein the bypass mechanism further comprises a bypass arm attached to the actuating link by means of a spring.

8. The vehicle of claim 5, wherein the bypass mechanism further comprises a pivot link, wherein the actuating link is supported on the pivot link.

9. A transaxle for use in a vehicle, the transaxle comprising:
   a multi-element housing;
   a plurality of mounting holes formed in the housing for use in securing the housing directly to the vehicle;
   a hydrostatic transmission disposed within the housing;
   a bypass mechanism having a position where the bypass mechanism is engaged with elements of the hydrostatic transmission; and
   a linkage attached to the bypass mechanism wherein the linkage is supported by attachment to one of the mounting holes, and said one of the mounting holes is not used to secure the housing to the vehicle.

10. The transaxle of claim 9, wherein the linkage comprises a pin that is positioned in said one of the mounting holes.

11. The transaxle of claim 10, wherein the pin is rotatably supported in said one of the mounting holes.

12. The transaxle of claim 9, wherein the linkage comprises an over-center mechanism to maintain the bypass mechanism in an engaged state.

13. The transaxle of claim 9, wherein the bypass mechanism comprises a bypass arm, a bypass actuating link, and a spring attached to the bypass arm and the bypass actuating link.

14. The transaxle of claim 9, wherein the bypass mechanism comprises an actuating link on which is formed a handle.

15. A bypass linkage for a transmission, wherein the transmission is disposed in a housing having a plurality of mounting holes for use in securing the housing to a vehicle by means of fasteners extending through the mounting holes into the vehicle, the bypass linkage comprising:
- a mounting pin;
- wherein the bypass linkage is supported by insertion of the mounting pin into one of the transmission housing mounting holes, and the mounting pin extends through said one mounting hole.

16. The bypass linkage of claim 15, wherein the mounting pin is rotatably retained within said one of the mounting holes by a cotter pin.

17. The bypass linkage of claim 16, further comprising a washer positioned between the cotter pin and said one of the mounting holes.

18. The bypass linkage of claim 15, wherein the bypass linkage comprises an actuator link attached to a bypass arm by means of a spring.

19. The bypass linkage of claim 18, wherein the bypass linkage further comprises an over-center mechanism such that when the bypass mechanism is engaged it will remain engaged by maintaining tension on the spring until disengaged by an operator.

20. The bypass linkage of claim 19, wherein the over-center mechanism comprises a pivot link, a stop formed on the pivot link, and a rotatable engagement of the actuator link with the pivot link and engagement of the actuator link with the stop.

* * * * *